O. F. COLEMAN.
LOCKING DEVICE FOR STEERING WHEELS.
APPLICATION FILED MAR. 29, 1916.
1,195,782.
Patented Aug. 22, 1916.
2 SHEETS—SHEET 1.
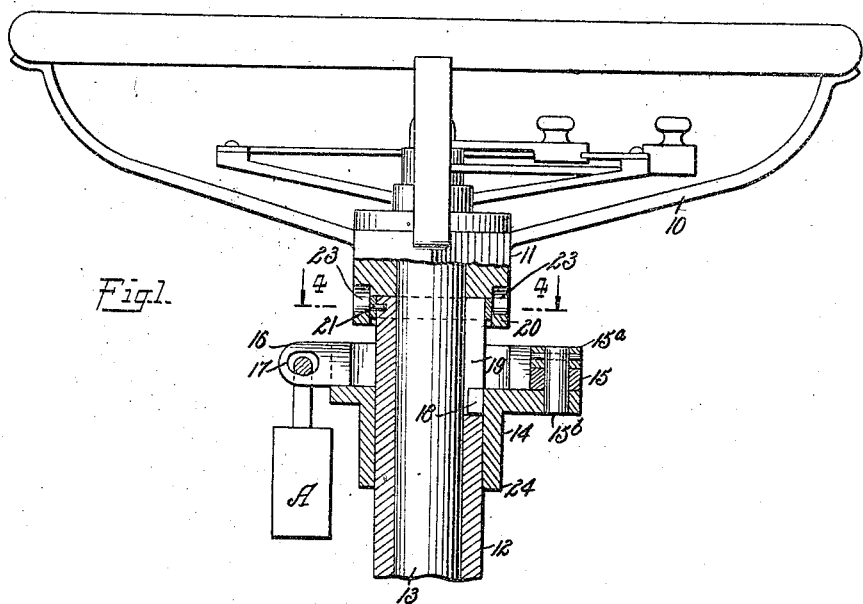
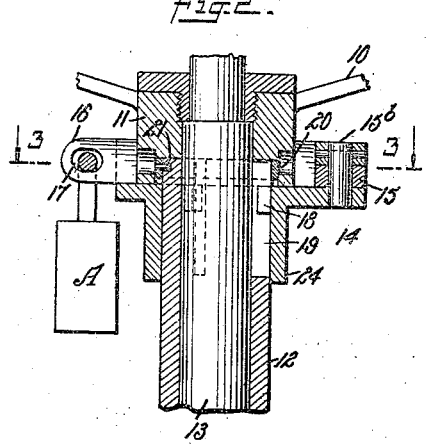
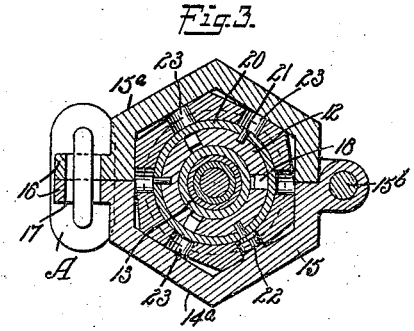
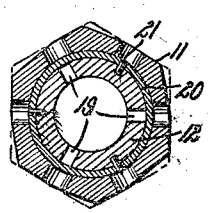
WITNESSES:
INVENTOR
Oscar F. Coleman
BY
ATTORNEY

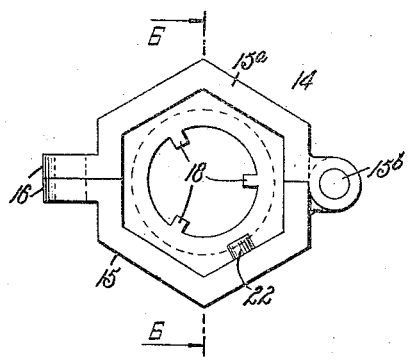
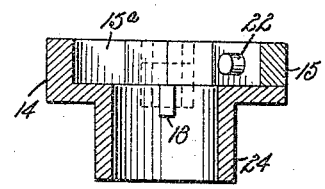
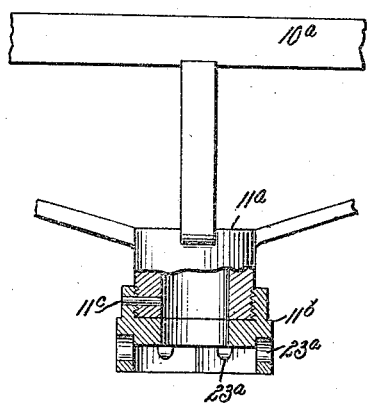
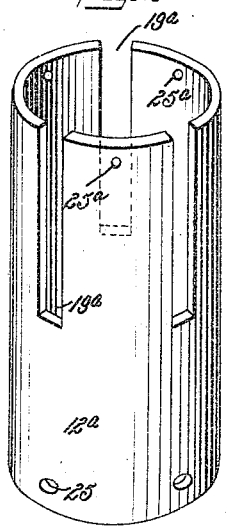
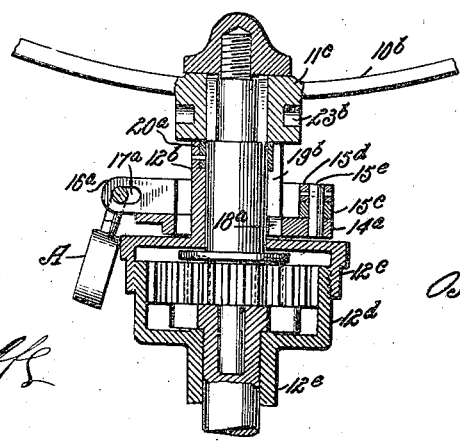

UNITED STATES PATENT OFFICE.

OSCAR F. COLEMAN, OF EL PASO, TEXAS.

LOCKING DEVICE FOR STEERING-WHEELS.

1,195,782.   Specification of Letters Patent.   Patented Aug. 22, 1916.

Application filed March 29, 1916. Serial No. 87,569.

*To all whom it may concern:*

Be it known that I, OSCAR F. COLEMAN, a citizen of the United States, and a resident of El Paso, in the county of El Paso and State of Texas, have invented a new and Improved Locking Device for Steering-Wheels, of which the following is a full, clear, and exact description.

My invention relates to means for locking the steering wheel of an automobile so that the front axle may be securely held at an angle to prevent any other movement of the automobile, by unauthorized parties, than a movement in a circle or curve of small radius, or a movement against the curb if the front wheels are disposed adjacent to the curb.

General objects of the invention are to provide a locking means of the indicated character that may be expeditiously engaged with the wheel and firmly secured in locked position, and as quickly disengaged from the wheel to release the latter; and to provide a reliable locking means of simple form.
More specific objects of the invention and the advantages of the novel construction and arrangement of the parts will appear as the description proceeds.

Reference is to be had to the accompanying drawings forming a part of this specification in which similar reference characters indicate corresponding parts in all the views.

Figure 1 is a transverse vertical section of the upper portion of a steering rod and steering post having my invention applied thereto, the view including the steering wheel partly in side elevation, the locking devices being out of engagement with the wheel; Fig. 2 is a transverse vertical section showing the locking devices in locked engagement with the wheel hub; Fig. 3 is a horizontal section on the line 3—3, Fig. 2; Fig. 4 is a detail horizontal section on the line 4—4, Fig. 1; Fig. 5 is a plan view of the locking sleeve; Fig. 6 is a vertical section on the line 6—6, Fig. 5; Fig. 7 is a perspective view of a reinforce for steering posts of thin material; Fig. 8 is a partly section side elevation showing an attachment for wheels having round hubs to adapt the hub to receive my improved locking means; Fig. 9 is a vertical section with the locking devices in the disengaged position, and showing the invention adapted to the special steering devices of the Ford automobile.

Referring more particularly to Figs. 1 to 6, the steering wheel 10 may be generally of any standard make and having a hub 11, adapted to receive my improved locking means. The numeral 12 indicates the steering post and 13, the steering rod. My improved locking means includes a device designated generally by the numeral 14 and being essentially in the form of a sleeve, slidably fitted on the steering post 12. Said sleeve 14 is provided with a clamp including fixed and movable members, 15, 15$^a$, the one member 15 being pivoted as at 15$^b$ to swing in a horizontal plane to and from the relatively fixed clamp member. Both clamp members are formed with lugs 16 at one side to lie adjacent to each other when the swinging arm is closed, said lugs being provided with alined holes 17 to receive the shackle of a padlock A. It is to be understood that any other suitable locking means may be provided to retain the swinging arm 15$^a$ in the closed position. The sleeve 14, at the inside, is formed with radially projecting studs 18, which are received in vertical slots 19 in the post 12 at the upper end of the latter. To close the upper ends of the slots 19, a ring 20 is secured to the post 12 by rivets 21, or other means.

The swinging clamp member 15$^a$ is formed, as clearly seen in Figs. 3, 5 and 6, with a stud or projection 22 on the inner face and the hub 11 is formed with radial recesses 23, either of which is adapted to receive the said projection 22. In the use of the lock, however, the wheel 10 having been turned to dispose the front axle of the automobile at an angle to prevent the automobile from traveling in a straight direction, the arm 15$^a$ of the clamp is swung outwardly and the sleeve 14 is raised to the hub 11 so that the latter is received within the clamp. The swinging arm is now brought to the closed position to enter with the projection 22 thereof within one of the recesses 23 of the hub. In this position of the clamp, the lock A is applied so that the wheel is firmly locked against turning and the front axle thus maintained at the given angle. The hub 11 preferably, is hexagonal or otherwise made non-circular on the outer surface, and the interior of the clamp is formed to correspond. When hubs are not provided with the hexagonal face, an attachment 11$^b$, Fig. 8, may be threaded to the hub 11$^a$ of the wheel 10$^a$ and secured by a pin 11$^c$ or equivalent means. Said attachment 11<sup>b</sup> will present a polygonal face and will be provided with recesses 23<sup>a</sup> corresponding with the recesses 23. In the case of tubular steering posts of thin material, which, when slotted, might not have sufficient strength to prevent the forcible turning or wrenching of the locking device, a reinforce 12<sup>a</sup>, Fig. 7, may be applied to the post and secured thereto by rivets through holes 25 in said reinforce, the latter having slots 19<sup>a</sup> to register with the slots 19 in the post. It is to be understood that the ring 20 is to be employed with the reinforce 12<sup>a</sup>, the latter being formed with holes 25<sup>a</sup> to receive the rivets or pins 21 previously referred to. With the reinforce secured by fastening means passing through the holes 25<sup>a</sup> after being slipped over the usual steering post, the latter need not be slotted.

In Fig. 9 the invention is shown applied to the steering devices of a Ford automobile. The sleeve 14<sup>a</sup> in this instance is in the form of a comparatively thin ring. Otherwise, it is the same in all respects with the sleeve 14, being equipped with fixed and movable clamp members, 15<sup>c</sup>, 15<sup>d</sup>, the latter being pivoted as at 15<sup>e</sup>, the clamp members having lugs 16<sup>a</sup> and slots 17<sup>a</sup> for receiving the shackle of the lock A. The sleeve 14<sup>a</sup> has studs 18<sup>a</sup> corresponding with the studs 18 and these are received in slots 19<sup>b</sup> in a neck 12<sup>b</sup> corresponding, except as to the height and the provision of the slots 19<sup>b</sup>, with the usual neck on the cap 12<sup>c</sup>, which is provided for the gear box 12<sup>d</sup> on the collar 12<sup>e</sup> of the Ford car. The neck 12<sup>b</sup> has a ring 20<sup>a</sup> corresponding with the ring 20, being suitably secured in position to close the upper ends of the slots 19<sup>b</sup>. The hub 11<sup>c</sup> of the wheel 10<sup>b</sup> is provided with recesses 23<sup>b</sup> for receiving the described stud 22 on the clamp.

Having thus described my invention I claim as new and desire to secure by Letters Patent:

1. A locking means for steering wheels including a sleeve arranged to be slidably mounted on a steering post for movement to and from the steering wheel while held against turning movement on the said post, a clamp on the said sleeve including a lateral swinging arm adapted to interlock with the hub of the steering wheel, and means to lock the said clamp in engagement with the hub.

2. The combination with a steering wheel and steering post having vertical slots therein, a sleeve slidable on the post and provided with members to enter said slots to be slidable therein, a clamp including a laterally swinging arm, a projection on said arm, the wheel hub having lateral recesses at different points therearound to receive said projection, and means on the swinging arm and on a relatively fixed part of the sleeve adapted to receive a lock.

3. The combination with a steering wheel and a steering post having a vertical slot adjacent to the wheel hub, a sleeve slidably fitting said post for movement to and from the hub and formed with a stud extending into the slot of the post, the said sleeve being of a length to cover the slots in the raised position of the sleeve, a clamp on said sleeve adapted to embrace the wheel hub, said clamp including side members, one of which is pivoted to swing laterally to and from the other member, said clamp members having lugs adapted to receive a lock, the said pivoted member having a projection on the inner face thereof, and the wheel hub having a recess adapted to receive said projection.

4. A locking means for steering wheels including a member having vertical slots, a sleeve having studs extending into said slots and adapted to engage a wheel hub, a fixed clamp member on the sleeve, a pivoted clamp arm on said sleeve and movable laterally toward and from the fixed member and provided with a lateral projection at the interior, said clamp members having polygonal inner faces and formed with lugs adapted to receive a lock; in combination with a steering wheel having a polygonal hub formed with recesses adapted to receive said lateral projection.

5. The combination with a steering wheel having a polygonal hub, of a clamp slidably mounted below the hub for movement to and from the latter while held against turning, the said clamp having a polygonal interior to correspond with the hub, and means to hold the clamp in engagement with the hub.

6. In a locking device for steering wheels, a tubular reinforce adapted to be slipped over the steering post of an automobile and having means at its lower end to secure said reinforce to the steering post, the upper end of said reinforce having vertical slots adapted to receive a wheel-locking means, and a ring secured to said reinforce at the interior of the same, adjacent to and closing the upper ends of said slots.

7. The combination with a steering wheel and a steering post having vertical slots therein, and a ring at the upper ends of the slots to close the latter, of a sleeve slidable on the post and provided with members to enter the slots to be slidable therein, and a clamp including a laterally swinging arm having a projection at the inner side thereof, the hub of the wheel having lateral recesses to receive said projection, and means on the swinging arm and on the relatively fixed part of the sleeve adapted to receive a lock.

8. The combination with a steering wheel and a polygonal member secured to the hub of the wheel and coaxial therewith, and formed with lateral recesses, of a clamp slidably mounted below the hub for movement to and from the latter and held against turning, the said clamp having a polygonal interior to correspond with the said polygonal member, the said clamp furthermore, having a laterally movable member formed with a projection to enter said recesses.

9. The combination with a steering wheel and a steering post having a vertical slot therein, a sleeve slidable on the post and provided with a member thereon projecting radially inward into said slot and preventing turning movement of the sleeve while permitting sliding movement thereof on the post, to and from the hub of the wheel, a laterally swinging arm on said sleeve, interlocking members on said arm and on the wheel hub engaging and disengaging by the swinging movements of the said arm, and means to lock the arm in engagement with the hub.

In testimony whereof I have signed my name to this specification in the presence of two subscribing witnesses.

OSCAR F. COLEMAN.

Witnesses:
JAMES A. SMITH,
BERRY W. MORRIS.